United States Patent [19]

Kim

[11] Patent Number: 5,363,416
[45] Date of Patent: Nov. 8, 1994

[54] DATA INTERFACING METHOD AND ITS DEVICE

[75] Inventor: Jae W. Kim, Suwon, Rep. of Korea

[73] Assignee: Samsung Electronics Co., Ltd., Kyungki-Do, Rep. of Korea

[21] Appl. No.: 21,234

[22] Filed: Feb. 23, 1993

[30] Foreign Application Priority Data

Feb. 26, 1992 [KR] Rep. of Korea .................. 92-3017

[51] Int. Cl.$^5$ ............................................. H04L 7/00
[52] U.S. Cl. .................... 375/106; 375/121; 375/117
[58] Field of Search ............... 375/106, 114, 116, 117, 375/121; 370/47, 48, 91, 105.1, 105.4

[56] References Cited

U.S. PATENT DOCUMENTS

| | | | |
|---|---|---|---|
| 4,208,650 | 6/1980 | Horn | 375/117 |
| 4,694,470 | 9/1987 | Shimatani et al. | 375/121 |
| 5,007,088 | 4/1991 | Ooi et al. | 370/105.1 |

*Primary Examiner*—Stephen Chin
*Assistant Examiner*—Don Vo
*Attorney, Agent, or Firm*—Sughrue, Mion, Zinn, Macpeak & Seas

[57] ABSTRACT

A data interfacing system for asynchronous data which has a predetermined data format and receives a data group transmitted in an asynchronous manner, uses a predetermined basic clock signal in providing synchronism to asynchronous data group. The system generates a line recognizing signal corresponding to each data line in the particular format of the data group, generates a line clock signal having a predetermined pulse at the end point of each data line in response to the line recognizing signal and the basic clock signal. The system also generates a pulse signal having a period corresponding to a single data bit of the data group by counting the basic clock signal during a data bit section enabled by the line recognizing signal. The data is fed to a shift register permitting particular data to be extracted synchronously from the data group. A corresponding data interfacing method is also described.

25 Claims, 5 Drawing Sheets

FIG.1A
| STA_1 | X14 | X15 | XS | D3_1 | D4_1 | PI_C | RDY | D7_1 | PAR_1 | Stop_1 |
|---|---|---|---|---|---|---|---|---|---|---|
| STA_2 | X7 | X8 | X9 | X10 | X11 | X12 | X13 | D7_2 | PAR_2 | Stop_2 |
| STA_3 | X0 | X1 | X2 | X3 | X4 | X5 | X6 | D7_3 | PAR_3 | Stop_3 |
| STA_4 | Y14 | Y15 | YS | D3_4 | D4_4 | D5_4 | D6_4 | D7_4 | PAR_4 | Stop_4 |
| STA_5 | Y7 | Y8 | Y9 | Y10 | Y11 | Y12 | Y13 | D7_5 | PAR_5 | Stop_5 |
| STA_6 | Y0 | Y1 | Y2 | Y3 | Y4 | Y5 | Y6 | D7_6 | PAR_6 | Stop_6 |
| STA_7 | F0 | F1 | F2 | F3 | F4 | F | D6_7 | D7_7 | PAR_7 | Stop_7 |
FIG.1B
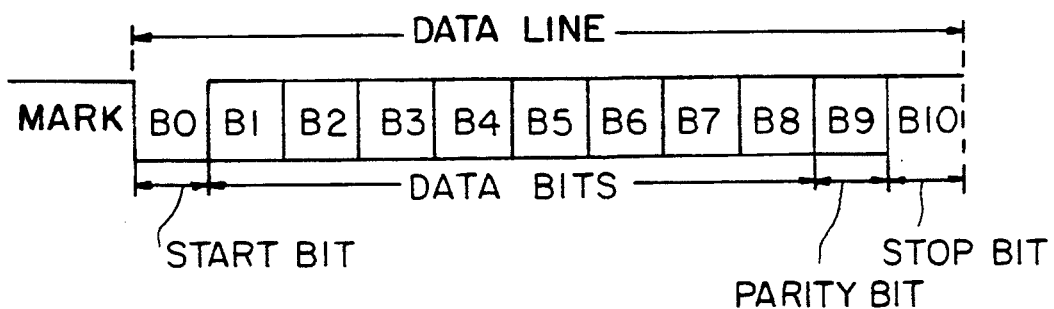
FIG.1C
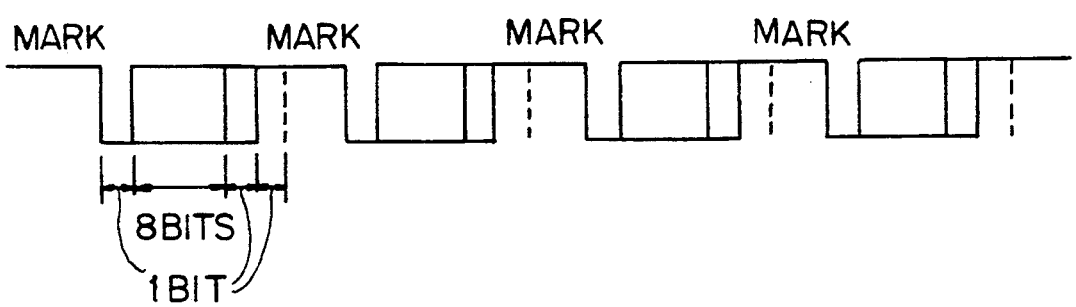

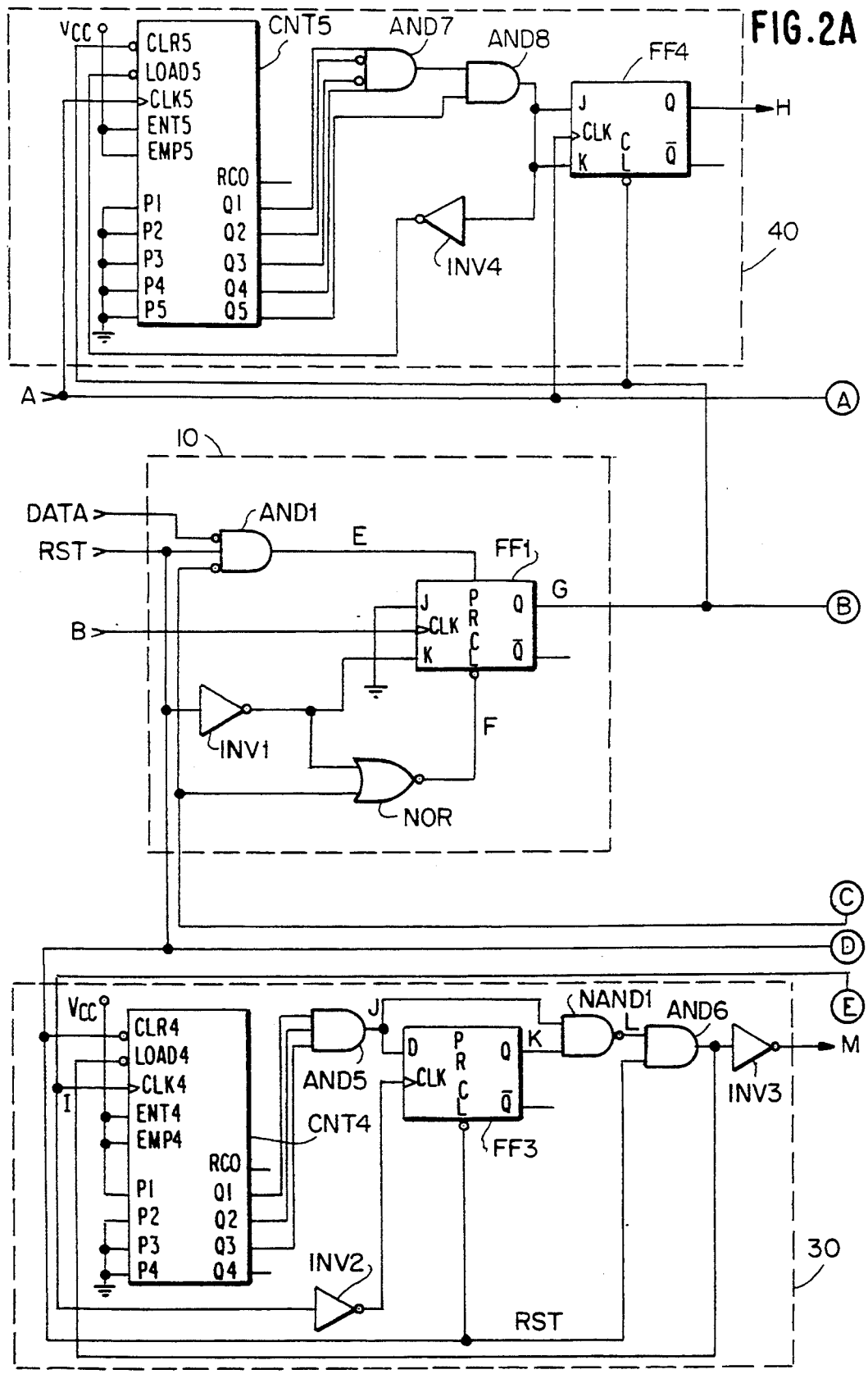

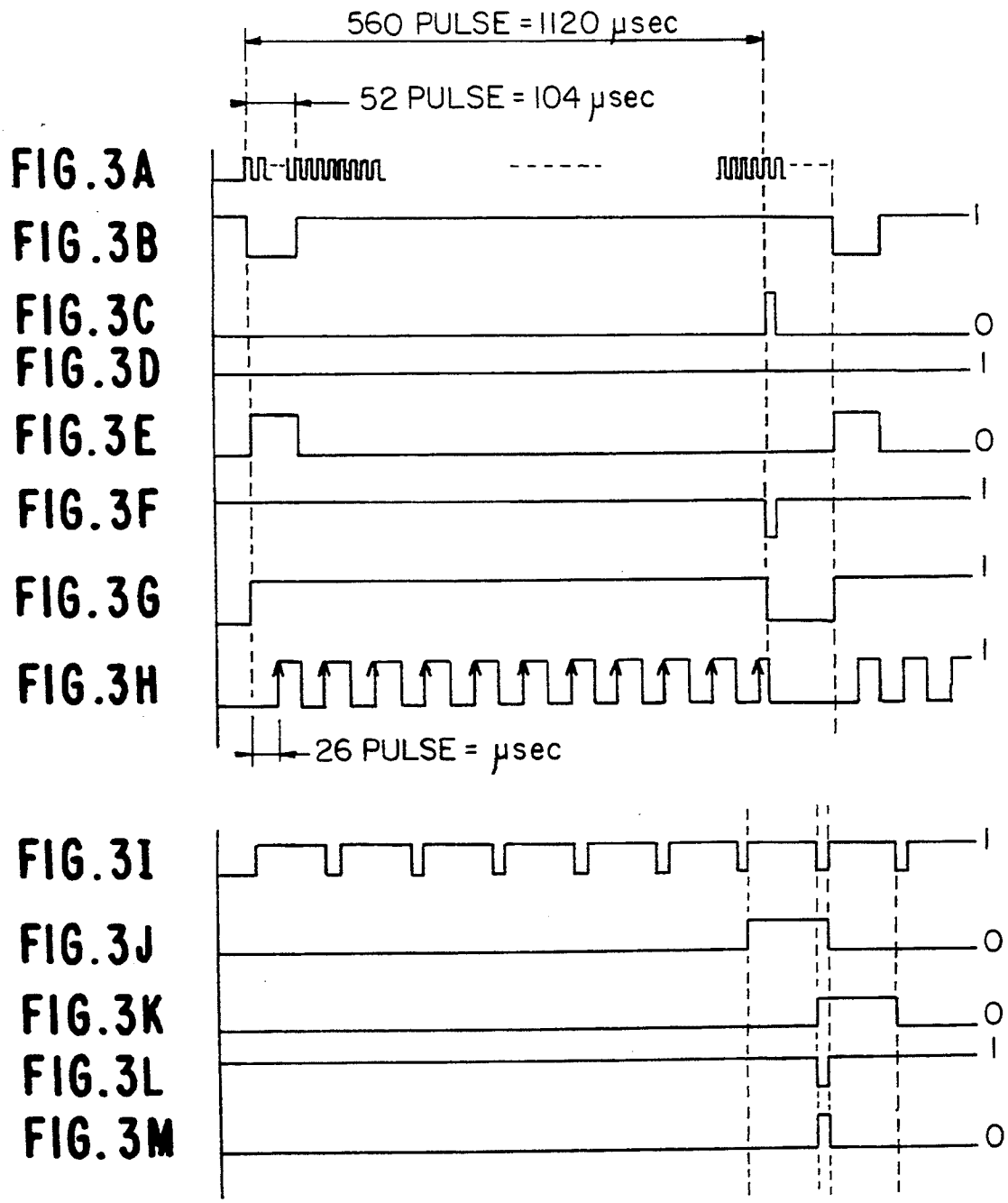

DATA INTERFACING METHOD AND ITS DEVICE

BACKGROUND OF THE INVENTION

The present invention relates to a digital data interfacing system, and more particularly to a data interfacing method and its device for providing a predetermined synchronism to a predetermined magnitude data group transmitted asynchronously with a predetermined data format.

Generally, a video appliance or an audio appliance or the like comprises a data input device for inputting data by a user and a data processing device for processing the input data. There are many systems or subsystems in a system for transmitting the data from a data input device to a data processing device, and the present invention relates to a data interfacing system for processing the digital data transmitted asynchronously in serial form. There are various kinds of data input devices for generating data asynchronously in serial form, such as, for example, a mouse, joy stick, tablet, etc. Since such data input devices can easily draw a figure or pattern, they have come into wide use. In the case of a tablet, when any figure or pattern is drawn on the tablet with an electronic pen, a predetermined data group corresponding to each picture point is produced, and the data of this data group is transmitted asynchronously in serial form. However, since most electronic appliances recognize data exchange only for synchronous data matched to a predetermined clock signal, the asynchronous data of the tablet must be synchronized in order for the data exchange between the tablet and the data processing device to occur. Also, a data processing device requires a process which deletes redundancy data and extracts only necessary data, and an interfacing system for synchronizing the input data is required also for such data processing.

A conventional data interfacing system synchronizes the digital data of a predetermined data group unit transmitted asynchronously in serial form from a data input device, and particular software is used in the data interfacing system for extracting particular data from this synchronized data group. However, in case of carrying out the data interfacing operation by a software system, there have been problems in that the software must be different or changed to be matched to the characteristic of the corresponding appliance in accordance with the appliance for executing the data input and process, and one must always be careful so as not to damage the program. There has also been a problem that there might be a limit on the data processing speed due to the software like data processing system, and thereby it is inconvenient to a user.

SUMMARY OF THE INVENTION

Therefore, it is an object of the present invention to provide an interfacing device which not only synchronizes the digital data transmitted asynchronously between the data input means and the data processing means, but also embodies in hardware the data interfacing system for extracting necessary particular data from the synchronized data.

Another object of the present invention is to provide a method for embodying said data interfacing device in hardware.

The objects of the present invention are attained by a data interfacing device which has a predetermined data format, and receives asynchronous serial data consisting of a predetermined magnitude data group composed of a number of data lines each consisting of a multiplicity of data bits. The data interfacing device uses a pulse signal having a predetermined frequency as a basic clock signal and provides a predetermined synchronism to said data group. The data interfacing device comprises a means for generating a line recognizing signal for recognizing a section of each data line by receiving in series the asynchronous data of the data group included with a start bit indicating a start of each said data line, a means for generating a line clock signal having a predetermined pulse at an ending time point of each data line by receiving said basic clock signal and a line recognizing signal outputted from said line recognizing signal generating means, a means for generating a group clock signal having a predetermined pulse at an ending time point of said data group by receiving a line recognizing signal outputted from said line recognizing signal generating means, and a means for generating a synchronizing clock signal for synchronizing each data bit of said data group by receiving said basic clock signal and a line recognizing signal outputted from said line recognizing signal generating means.

Another object of the present invention is to provide; in a data interfacing method which has a predetermined data format, receives in asynchronous type serial data format a predetermined magnitude data group composed of a number of data lines, each consisting of a multiplicity of data bits, and for providing synchronism to said data group; a data interfacing method comprising: generating a line recognizing signal having a predetermined level at a section of each data line by receiving in serial asynchronous data of the data group included with a start bit indicating a start of each said data line, generating a line clock signal having a predetermined pulse at an ending time point of each data line from said basic clock signal and the line recognizing signal obtained from said line recognizing signal generating step, generating a group clock signal having a predetermined pulse at an ending time point of said data group from the line recognizing signal obtained from said line recognizing signal generating step, and generating a synchronizing clock signal for synchronizing each data bit of said data group from said basic clock signal and the line recognizing signal obtained from said line recognizing signal generating step.

BRIEF DESCRIPTION OF THE DRAWINGS

FIG. 1A to FIG. 1C are diagrams illustrating an example of data format used for data interfacing, FIG. 3A to FIG. 3M are operating wave form charts for the device of FIG. 2.

DETAILED DESCRIPTION OF THE PREFERRED EMBODIMENTS

Hereinafter, the preferred embodiments of the present invention will be described in more detail with reference to the accompanying drawings.

Firstly, before describing the data interfacing device in accordance with the present invention, a data format generated by a tablet input device will be briefly described. The tablet creates a data input when any figure or pattern is drawn thereon with an electronic pen, and one picture point input on the tablet by the electronic pen produces a data group made of '77' bits. FIG. 1A shows the format of a data group corresponding to one picture point input on the tablet by the electronic pen. The data group corresponding to one picture point is made of '7' data lines, and each data line is made of '11' data bits.

An example of a suitable digitizer for producing a 77 bit group for each picture point or pixel is 12"×12" Digitizer of Wacom Co., Ltd. This digitizer and the resulting data format, as in FIG. 1A, are described in the *User Manual for SD-420A/421A/422A 12"×12" Type Digitizer*, by Wacom Co., Ltd., pub. March 1989. All symbols shown in FIG. 1A are either binary "1" or binary "0". The symbols RDY and P1_C designate certain positions of the stylus and cursor within or without the active reading range. X0–X15 represent the X coordinate of the pixel, and Y0–Y15 represent the Y coordinate of the pixel. F represents a switch position, XS and YS are respective sign bits for the X and Y coordinates, and the symbols STA, PAR and STOP represent the line start bits, the line parity bits, and the line stop bits, respectively. The D symbols are not relevant to the subject invention.

FIG. 1B shows the format of one data line. Each data line consists of 11 bits, shown in FIG. 1B as B0–B10. B0 is the line start bit, B9 the parity bit, B10 the line stop bit, and B1–B8 are the line data bits. There is also a predetermined mark signal between each data line. The mark signal is used as a code or a symbol signal for indicating a temporal or a spatial event in a data group transmitted asynchronously. A low level start bit following a high level mark signal indicates the beginning of a line, as shown in FIG. 1C. Also FIG. 1C shows a plurality of such lines transmitted in series. Seven such lines are transmitted to form a data group.

In the data group of FIG. 1A, the data required for the interface, other than the start bit, parity bit and stop bit (21 bits in all), are '56' data bits. Further, coordinate data required for displaying one picture point comprises '32' data bits (X0, X1 . . . , X15, Y0, Y1, . . . , Y15) bound by dotted lines in FIG. 1A. Therefore, in order to display the corresponding picture point in the data group of '77' bits transmitted from the data input device, the coordinate data of '32' bits should be extracted. Thus, in order to extract the coordinate data from the data group, a predetermined synchronism must be given to the asynchronous data transmitted in series.

Figure 2B:
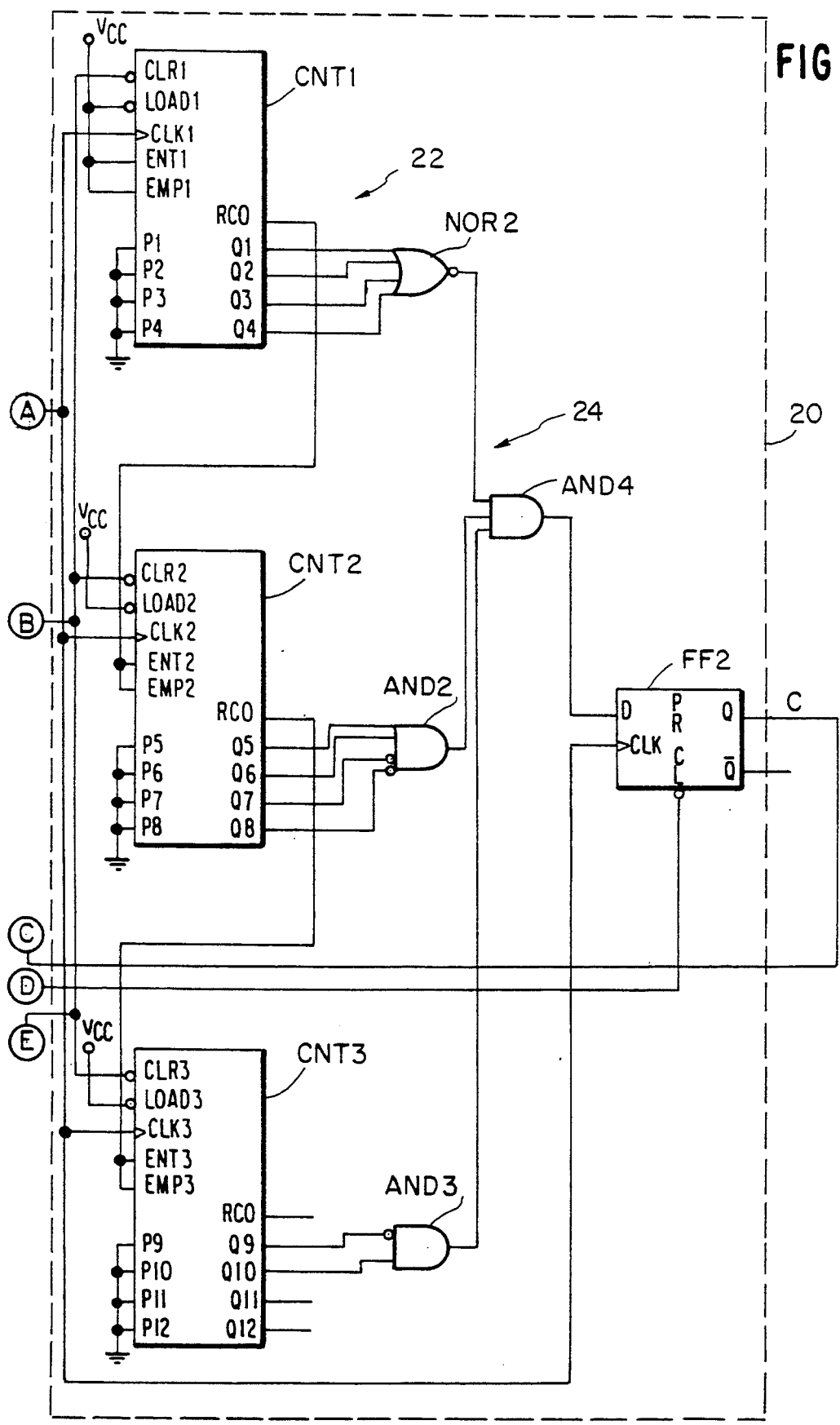
FIG. 2 is a circuit diagram showing a preferred embodiment of a data interfacing device in accordance with the present invention.

FIG. 2 shows a preferred embodiment of the data interfacing device in accordance with the present invention. The device of FIG. 2 comprises: a line signal generating section 10 for receiving asynchronous data input as a data group unit and generating a line recognizing signal having a predetermined pulse corresponding to each data line section, a line clock generating section 20 for receiving a line recognizing signal generated by the line signal generating section 10 and a basic clock signal of a predetermined frequency and generating a line clock signal having a predetermined pulse at an ending time point of each data line, a group clock generating section 30 for receiving a line recognizing signal generated at the line signal generating section 10 and generating a group clock signal having a predetermined pulse at an ending time point of the data group, and a synchronizing clock generating section 40 for generating a synchronizing signal for synchronizing the asynchronous data for extracting coordinate data from said data group.

The line signal generating section 10 comprises: a first AND gate AND1 for receiving the asynchronous data DATA, a predetermined reset signal RST and the line clock signal outputted from the line clock generating section 20, whereby AND gate AND1 generates a predetermined preset signal; a first NOR gate NOR1 for receiving said line clock signal and an inverted reset signal, whereby said NOR gate NOR1 generates a predetermined clear signal; and a JK-flipflop FF1 in which the 'J'-input terminal is grounded, said inverted reset signal is input to the'K'-input terminal, a preset signal output from said first AND gate AND1 is input to a preset terminal PR, a clear signal output from said first NOR gate NOR1 is input to a clear terminal CL, and the clock terminal receives a predetermined start bit pulse whereby said flipflop FF1 outputs the line recognizing signal.

The line clock generating section 20 comprises: a modulo-560 counter 22 (consisting of CNT1, CNT2 and CNT3) which receives a line recognizing signal G output from the line signal generating section 10 and a predetermined clock signal A. Counter 22 counts the clock signals A and outputs a counting data of '10' bits; a logic section 24 (consisting of NOR2, AND2, AND3 and AND4), which receives the 10 bit count value from the modulo-560 counter 22, outputs a predetermined logic signal when the '10' bit count value corresponds to the decimal number '560'; and a second flipflop FF2, which receives said predetermined clock signal A and a logic signal output from the logic section 24 via an input terminal, and generates a pulse at the end of each data line section, whereby said latter pulse, representing the line clock, is applied to the first AND gate AND1 of said line signal generating section 10.

The group clock generating section 30 comprises: a modulo-7 counter CNT4, which receives a line recognizing signal output from the line signal generating section 10; a fifth AND gate AND5, which receives the '3' bits count value output from the modulo-7 counter CNT4 and outputs a predetermined logic signal when the '3' bit count value corresponds to the decimal number '7'; a third flipflop FF3, which receives a logic signal output from the fifth AND gate AND5 and an inverted signal of the line recognizing signal fed from the line signal generating section 10, generates a pulse at an end of the data group; and additional logic elements NAND1, AND6, INV2 and INV3.

The synchronizing clock generating section 40 comprises: a modulo-26 counter CNT5, which receives a line recognizing signal output from the line signal generating section 10, and said basic clock signal A, executes a counting operation and outputs a 5 bit count value; a seventh AND gate AND7 and eighth AND gate AND8, which receive the '5' bit count value output from the modulo-26 counter CNT5 and output a predetermined logic signal when the '5' bit count value corresponds to the decimal number '26'; and a fourth flipflop FF4, which receives an output signal of the eighth AND gate AND8 and said basic clock signal A and outputs a synchronizing signal for synchronizing said asynchronous data.

Wave form charts of signals input at each section of the device of FIG. 2 are shown in FIG. 3A to FIG. 3M. The operation of the device of FIG. 2 will be described in more detail with reference to the wave form charts of FIG. 3A to FIG. 3M.

Generally, data generated by the tablet has various possible transmission speeds. Conventional transmission speeds are 150, 300, 600, 1200, 2400, 4800, 9600 and 19200 BPS (Bits Per Second). The device of FIG. 2, which is an embodiment of the present invention, will be described for the case that the data transmission speed is 9600 BPS. A data transmission speed of 9600 BPS means that 9600 bits of data are transmitted during a period of one second, and the transmission time period allocated for each bit is 104 μsec. The transmission time period of a single data line shown in FIG. 1B becomes $104 \times 11 = 1144$ μsec. When a basic clock signal A having a frequency of 0.5 MHz, as shown in FIG. 3A, is used for the basic clock signal in the device of FIG. 2, one pulse period becomes 2 μsec, and a section of one bit corresponds to 52 clock pulses. A count of 560 clocks of the clock signal corresponds to a period of 1120 μsec. In order to transmit one data line within this 1120 μsec period, 11 data bit clocks should be produced. A bit pulse signal having 11 bit clocks within 1120 μsec section is shown in FIG. 3H. Thus, the operation will be described on the assumption that the data transmitting speed is 9600 BPS and the basic clock signal of 0.5 MHz is used.

In the device of FIG. 2, the inputs to the first AND gate AND1 of the line signal generating section 10 include, asynchronous data DATA having a transmission speed of 9600 BPS, a reset signal RST, which is at a high level during operation, and a line clock signal C, as shown in FIG. 3C and applied to AND1 from the line clock generating section 20. AND gate AND1 generates a preset signal E, as shown in FIG. 3E, and feeds preset signal E to a preset terminal of the first flipflop FF1. The first NOR gate NOR1 receives the line clock signal C and an inverted reset signal and generates a clock signal F, as shown in FIG. 3F, whereby clock signal F is fed to a clock terminal of the first flipflop FF1. Since a J-terminal of the first flipflop FF1 is grounded and a K-terminal receives the inverted reset signal, the input signals of the J and K terminals both become '0' at the occurrence of the reset signal, and a clock signal, as shown in FIG. 3B, is input to the clock terminal. FIG. 3B is a start bit pulse signal having a low level in the section of the start bit for each of the data line sections. The output G of the first flipflop FF1 outputs a high level determined by preset signal E when the data line is started. The rising edge of the start bit pulse signal B is input to the clock terminal simultaneously with the preset signal E being dropped down to a low level and a '0' value is applied to the J and K terminals, and therefore the first flipflop FF1 maintains a previous output value as it is when the clock pulse is applied. Thus, the first flipflop FF1 generates a pulse signal G, as in FIG. 3G. The pulse signal G of FIG. 3G is a line recognizing signal and maintains a high level during the 11 bits of the data line section.

The line recognizing signal G from the first flipflop FF1 is fed, respectively, to the modulo-560 counter 22 of the line clock generating section 20, a modulo-7 counter CNT4 of the group clock generating section 30, a modulo-26 counter CNT5 of the synchronizing clock generating section 40, and the fourth flipflop FF4. The modulo-560 counter 22 of the line clock generating section 20 is made up of three counters CNT1, CNT2 and CNT3, each having a four bit output. The first counter CNT1 outputs the four lower position bits of the overall ten bit counting data output from the modulo-560 counter 22. The second counter CNT2 outputs the next highest 4 bits, and the third counter CNT3 outputs the 2 most significant bits.

The line recognizing signal G is applied to the clear inputs of counters CNT1, CNT2 and CNT3. Signal G is shown also in FIG. 3I on a time scale much greater than in FIG. 3G to enable viewing of multiple line recognizing pulses G. For consistency with the illustrated waveforms, the latter signal will now be referred to as pulse signal I, though it will be understood to be the same as line recognizing signal G. The first counter CNT1, the second counter CNT2 and the third counter CNT3 execute a counting operation when the line recognizing signal I is at a high level, and clear when the line recognizing signal I is at a low level. The first counter CNT1, the second counter CNT2 and the third counter CNT3 receive the basic clock signal A at their respective clock terminals and execute the counting operation. The first counter counts from 0000 to 1111, and upon receipt of the next clock A recycles to 0000 and provides a carry pulse from output terminal RCO to the load terminal LOAD2 of the second counter CNT2. The second counter CNT2 starts to count as the carry signal fed from the first counter CNT1 is input to the load terminal LOAD2. For the second counter CNT2, the operation is the same as the first counter CNT1, when the four bit counting value cycles from '0000' to '1111' and the next value generates a carry signal at the carry signal output terminal RCO for application to a load terminal LOAD3 of the third counter CNT3. Then, the third counter CNT3 starts counting and outputs counting data of 2 bits. Thus, the 10 bit counting data of the modulo-560 counter 22 output from the first counter CNT1, the second counter CNT2 and the third counter CNT3 is fed to the logic section 24.

The logic section 24 includes the second NOR gate NOR2, the second AND gate AND2, the third AND gate AND3 and the fourth AND gate AND4. The 4 bit output data of the first counter CNT1 is input to the second NOR gate NOR2, the 4 bit output data of the second counter CNT3 is input to the second AND gate AND2, and the 2 bit output data of the third counter CNT3 is input to the third AND gate AND3. The second NOR gate NOR2 outputs a logic '1' when the input binary data is '0000', the second AND gate AND2 outputs a logic '1' when its input binary data is '0011', and the third AND gate AND3 outputs a logic '1' when its input binary data is '10'. The logic data output from the second NOR gate NOR2, second AND gate AND2 and the third AND gate AND3 are fed to the fourth AND gate AND4. The fourth AND gate AND4 outputs a logic '1' when the input data thereto are all logic '1'. Accordingly, when the 10 bit counting data output from the modulo-560 counter 22 is '1000110000', that is, '560' in decimal terms, the fourth AND gate AND4 of the logic section 24 outputs a logic '1'. The logic signal output from the fourth AND gate AND4 of the logic section 24 is applied to a data input terminal of the second flipflop FF2. The second flipflop FF2 has applied thereto a logic '1' during one bit section from the logic section 24 when the counting value of the modulo-560 counter 22 is '560'. At this time, a clock pulse of the basic clock signal A is input to a clock terminal, so that a pulse signal C, as shown in FIG. 3C, is generated. FIG. 3C is a line clock signal, which occurs as a pulse at a time point at which each data line comes to end. The line clock signal C is fed, respectively, to the first AND gate AND1 and the first NOR gate NOR1 of aforementioned line signal generating section 10 and generates a preset signal E and a clear signal F.

The modulo-7 counter CNT4 of the group clock generating section 30 is fed with a continued line recognizing signal I from the line signal generating section 10, and is fed with the reset signal to a clear terminal and executes a counting operation. Since an input value of the lowermost bit input terminal among the 4 bit input terminals of the modulo-7 counter CNT4 is fixed at a high level by Vcc, the counting data starts from '001'. The 3 bit counting data output from the modulo-7 counter CNT4 is input to a fifth AND gate AND5. The fifth AND gate AND5 outputs a logic '1' when the 3 bit input data is '111'. Accordingly, the fifth AND gate AND5 outputs a logic '1' every time the counting data of the modulo-7 counter CNT4 counts from '001' to '111', corresponding to seven lines of data. A pulse signal of FIG. 3J output from the fifth AND gate AND5 is fed to a data input terminal for the third flip-flop FF3 and the first NAND gate NAND1. The third flipflop FF3 is a D-flipflop. An inverted signal of the line recognizing signal I is input from inverter INV2 to a clock terminal. The flipflop FF3 outputs a pulse signal K, as shown in FIG. 3K. The first NAND gate NAND1 is fed with pulses J and K from the first AND gate AND1 and the third flipflop FF3, respectively, and provides an output pulse signal L, as shown in FIG. 3L. The output signal of the first NAND gate NAND1 is applied, along with the reset signal to a sixth AND gate AND6, and the output therefrom is inverted by a third inverter INV3 to provide a pulse signal M, as shown in FIG. 3M. The group clock signal M is used to output the extracted data from the registers SR1 through SR10, described hereafter with reference to FIG. 4.

The pulse signal M is a group clock signal generating a pulse at the ending time point of every data group. When a pulse signal L occurs, representing a count of 7 data lines and indicating the ending of a data group, a pulse signal is input to a load terminal LOAD4 of the modulo-7 counter CNT4 from AND6 and initializes the modulo-7 counter CNTR to a value of '001'.

The modulo-26 counter CNT5 of the synchronizing clock generating section 40 has applied thereto the continued line recognizing signal I from the line signal generating section 10 to a clear terminal CLR5, and is fed with the basic clock signal A to a clock terminal CLK5 to execute a counting operation. The modulo-26 counter CNT5 outputs counting data of 5 bits, and the four least significant bits are applied to a seventh AND gate AND7, and the most significant bit is fed to an eighth AND gate AND8. The eighth AND gate AND8 provides an output signal by logically combining the output of the seventh AND gate AND7 and most significant output bit of the modulo-26 counter CNT5. When the counter CNT5 becomes '11001', AND8 outputs a logic '1'. That is, the eighth AND gate AND8 outputs a logic '1' at every time the modulo-26 counter CNT5 counts a decimal number '26'. Then, a fourth flipflop FF4, which is a JK-flipflop, is fed with an output signal of the eighth AND gate AND8 to a data input terminal, and is fed with a basic clock signal A to a clock terminal CL whereby FF4 outputs a bit pulse signal H, as shown in FIG. 3H. The bit pulse signal H is changed from a high level to a low level or from a low level to a high level at every time when the modulo-26 counter CNT5 counts 26 pulses of the basic clock signal A. The bit pulse signal H output from the synchronizing clock generating section 40 provides bit synchronism to the asynchronous data. It will be appreciated that the period of waveform H corresponds to twice 26 clock pulses A, or $2 \times 26 \times 2$ $\mu$sec = 104 $\mu$sec, and that 104 $\mu$sec is the bit period of the data input in a 9600 BPS system.

Figure 4:
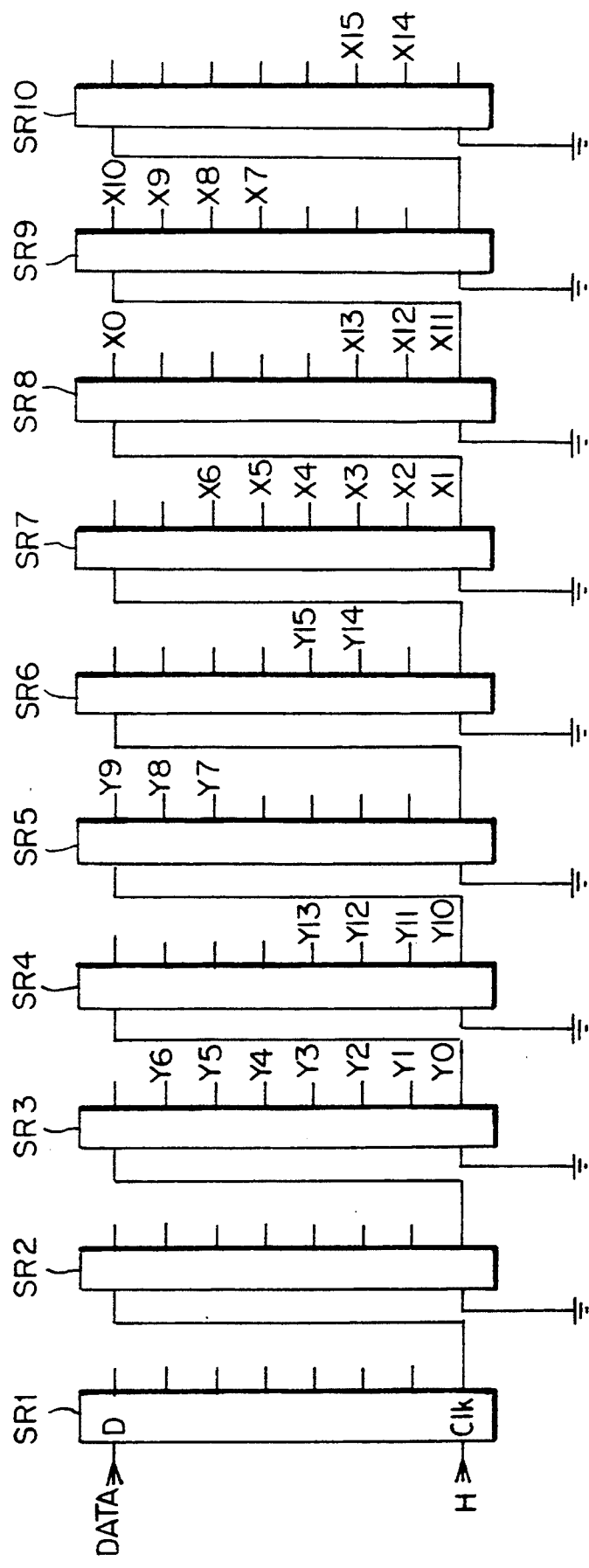
FIG. 4 is a block diagram showing another embodiment of a data extracting device in accordance with the present invention.

FIG. 4 is a circuit diagram for extracting data bits X0, X1, ... X15, Y0, Y1, ..., Y15 corresponding to the coordinate data in the data group of FIG. 1A. The device of FIG. 4 is composed of 10 shift registers SR1-SR10, which are connected in series so that the output bit of the last stage of each shift register is fed to the input terminal of the next shift register. The output bit of each shift register is allocated to a bit of the uppermost position of data stored in each shift register, and the data bit input to an input terminal of each shift register is obtained from a bit of the lowermost position of the previous shift register. In FIG. 4, asynchronous data is input in series to a data input terminal D of the first shift register SR1, and a bit pulse signal H from the synchronizing clock generating section 40 of FIG. 2 is applied to a clock terminal CLK. The asynchronous data input to a data input terminal is shifted by one bit every time a pulse of the bit pulse signal H is input to the clock terminal whereby the data bits are input in turn. Since the 10 shift registers store 8 bits of data each, when the bit pulse signal H provides '80' clocks to the clock terminal, the data bits input to the data input terminal of the first shift register SR1 will appear throughout the ten shift registers and the bits of any data group will be in known positions within the shift registers. Accordingly, it is possible to know the positions within the 10 shift registers of each data bit of the data group. As shown in FIG. 4, in the seven output terminals Y0-Y6 of third shift register SR3, four output terminals Y10-Y13 of fourth shift register SR4, three output terminals Y7-Y9 of fifth shift register SR5, two output terminals Y14, Y15 of sixth shift register SR6, six output terminals X1-X6 of seventh shift register SR7, four output terminals X0, X11, X12, X13 of eighth shift register SR8, four output terminals X7-X10 of ninth shift register SR9 and two output terminals X14, X15 of tenth shift register SR10, respective corresponding data bits are outputted, so that the 32 coordinate data bits can be extracted from the data group of FIG. 1A. The outputting of these data bits is under the timing control of the group clock signal M from the group clock generating section 30. The signal M is input to an output control terminal of each register SR1 to SR10. As a result, the registers output the selected data bits that are relevant to the stylus position, i.e., the pixel position. This output data is synchronized with the predetermined clock of the synchronized system.

As described above, the interfacing system in accordance with the present invention is fed with serial asynchronous data, with the data group having a predetermined data format, and uses a pulse signal having a predetermined frequency as a clock signal, and produces a group clock signal for synchronizing the data group, a line clock signal for synchronizing the data line consisting of the data group, and a bit clock signal for synchronizing the data bits of a data line. Synchronism is provided to the asynchronous data by utilizing the produced synchronizing signals. Necessary data can be extracted from the data group by synchronizing the asynchronous data. The present invention processes such data interfacing process in hardware without processing in software, so that the data processing speed is improved and a more convenient system is provided for the user.

What is claimed is:

1. A data interfacing device receiving asynchronous serial data of a predetermined format, said format being a predetermined data group composed of a number of data lines, each consisting of multiple data bits, and receiving a basic clock signal; said data interfacing device providing synchronism to said asynchronous serial data and comprising:

means responsive to said asynchronous serial data having a start bit at the start of said each data line for generating a line recognizing signal for recognizing a section of each data line;

means for responsive to said basic clock and said line recognizing signal for generating a line clock signal having a predetermined pulse occurring at an ending time point synchronized to the end of each data line;

means responsive to said line recognizing signal for generating a group clock signal having a predetermined pulse occurring at an ending time point synchronized to the end of each said data group; and means responsive to said basic clock signal and said line recognizing signal for generating a synchronizing clock signal for synchronizing each data bit of said data group.

2. A data interfacing device as defined in claim 1, further comprising a data extracting means for extracting data responsive to said synchronizing clock signal and said asynchronous serial data thereby extracting selected data bits from said data group.

3. A data interfacing device as claimed in claim 1, wherein said line recognizing signal generating means comprises:

a logic circuit for receiving said asynchronous serial data and said line clock signal and generating a signal having a predetermined pulse at the start bit of each data line; and a flipflop responsive to an output signal of said logic circuit and to said line clock signal for providing said line recognizing signal having a continuous logic level during each data line section.

4. A data interfacing device as claimed in claim 3, wherein said logic circuit is an AND gate which receives said asynchronous serial data and said line clock signal and generates a pulse signal of a predetermined period having a pulse of a high logic level during a respective start bit section.

5. A data interfacing device as claimed in claim 3, wherein said flipflop is a JK-flipflop in which a logic 'O' is applied to the 'J' and 'K' input terminals, the output signal of said AND gate is applied to a preset terminal, said line clock signal is applied to a clear terminal, and which has a start bit pulse signal having a pulse of high level from said start bit of each said data line applied to a clock terminal thereof.

6. A data interfacing device as claimed in claim 4, wherein said flipflop is a JK-flipflop in which a logic 'O' is applied to the 'J' and a 'K' input terminals, the output signal of said AND gate is applied to a preset terminal, said line clock signal is applied to a clear terminal, and which has a start bit pulse signal having a pulse of high level from said start bit of each said data line applied to a clock terminal thereof.

7. A data interfacing device as claimed in claim 1, wherein said line clock signal generating means comprises:

a counter responsive to said line recognizing signal being applied to a clear terminal thereof for counting said basic clock signal applied to a clock terminal thereof;

a logic section connected to an output of said counter for providing a logic output signal when the count in said counter corresponds to the number of basic clock pulses corresponding to a line of data; and a flipflop for receiving the logic output signal of said logic section and said basic clock signal for providing line clock signal.

8. A data interfacing device as claimed in claim 7, wherein said counter comprises a number of counter stages, each of which has said line recognizing signal applied to its clear terminal and said basic clock signal applied to its clock terminal.

9. A data interfacing device as claimed in claim 8, wherein said logic section comprises:

a plurality of logic elements for receiving respectively counting data outputted from said counter stages and outputting a logic '1' when the count data applied thereto is at a respective predetermined value; and an AND gate for receiving the output data from said logic elements and outputting a logic '1' when said logic elements output all logic '1s'.

10. A data interfacing device as claimed in claim 7, wherein said flipflop is a D-flipflop in which said logic output signal of said logic section is applied to a data input terminal, said basic clock signal is applied to a clock terminal, and which generates a high level pulse having a pulse section corresponding to a predetermined number of pulse sections of said basic clock signal at an ending time point of each said data line.

11. A data interfacing device as claimed in claim 1, wherein said group clock signal generating means comprises:

a counter responsive to said line recognizing signal being applied to a clock terminal therefor for executing a counting operation;

a first logic section for outputting a predetermined logic signal when the count accumulated by said counter coincides with the number of data lines in said data group; and a second logic section receiving an output signal of said first logic section and said line recognizing signal, for generating a group clock signal having a predetermined pulse at a time corresponding to the end of said data group.

12. A data interfacing device as claimed in claim 11, wherein said counter is reset to a predetermined value by said group clock signal from said second logic section.

13. A data interfacing device as claimed in claim 11, wherein said second logic section comprises:

a D-flipflop in which the output signal of said first logic section is input to a data input terminal thereof, and an inverted signal of said line recognizing signal is inputted to a clock terminal thereof, and which generates a pulse signal having a high level during one data line section; and a logic element receiving an output signal of said D-flipflop and said output signal of said first logic section for generating said group clock signal.

14. A data interfacing device as claimed in claim 1, wherein said synchronizing clock signal generating means comprises:

a counter responsive to said line recognizing signal applied to a clear terminal thereof for counting said basic clock signal applied to a clock terminal thereof; and a logic section for receiving count data output from said counter for generating a synchronizing signal having a period corresponding to a single data bit section of said asynchronous serial data.

15. A data interfacing device as claimed in claim 14, wherein said logic section comprises:

a logic element for receiving said count data output from said counter and for outputting a logical output of '1' when said count data is at a value corresponding to '½' of said '1' data bit section; and a JK-flipflop having a logical output of said logic element applied to its 'J' and 'K' terminals and having said basic clock signal applied to a clock terminal thereof, and outputting said synchronizing clock signal.

16. A data interfacing means as claimed in claim 14, wherein said logic section comprises a logic element and wherein said counter is reset to a predetermined value by a logic signal output from the logic element of said logic section.

17. A data interfacing means as claimed in claim 15, wherein said counter is reset to a predetermined value by said logical output from the logic element of said logic section.

18. A data interfacing device as claimed in claim 2, wherein said data extracting means comprises a plurality of shift registers for storing said asynchronous serial data of said data group clocked therein under control of said synchronizing clock signal.

19. A data interfacing device as claimed in claim 18, wherein said shift registers are connected in series and said asynchronous serial data of said data group is input to a data input terminal of the first of said shift registers and said synchronizing clock signal is input to a clock terminal of said first shift register and the output of each said shift register of a prior stage is applied to an input of the shift register of the next stage.

20. In a data interfacing method which has a predetermined data format, receives serial asynchronous data of a predetermined magnitude comprising a data group made up of a number of data lines each consisting of a multiplicity of data sections, said data interfacing method using a pulse signal having a predetermined frequency as a basic clock signal for providing a predetermined synchronism to said data group;

said data interfacing method comprising the steps of:

receiving in series said asynchronous data of the data group including a start bit indicating the start of each said data line and generating a line recognizing signal for each data line;

generating a line clock signal having a predetermined pulse at end time point of each said data line responsive to said basic clock signal and said line recognizing signal;

generating a group clock signal having a predetermined pulse at end time point of said data group responsive to said line recognizing signal; and generating a synchronizing clock signal for synchronizing each data bit of said data group responsive to said basic clock signal and said line recognizing signal.

21. A method as claimed in claim 20, further comprising extracting particular data from said data group by using said synchronizing clock signal obtained from said synchronizing clock signal generating step.

22. A method as claimed in claim 20, wherein said line clock signal generating step comprises:

counting said basic clock signal during the data line section of said line recognizing signal; and generating said line clock signal having a predetermined pulse at the termination of the count during each said data line section.

23. A method as claimed in claim 20, wherein said group clock signal generating step comprises:

counting the number of said data lines by using said line recognizing signal as a clock; and generating said group clock signal having a predetermined pulse at the termination of the count of the final data line of said data group.

24. A method as claimed in claim 20, wherein said synchronizing clock signal generating step comprises:

counting the clocks of said basic clock signal during the data line of said line recognizing signal; and generating a clock signal having a period corresponding to the period of each data bit of said data group.

25. A method as claimed in claim 21, wherein said data extracting step comprises:

applying said data of said data group in series to serial connected shift registers;

clocking said data into the first stage of said shift registers under timing control of said synchronizing clocks; and shifting said data serially through said shift registers under the time control of said synchronizing clocks.

* * * * *